US010374906B2

(12) United States Patent
Sharma et al.

(10) Patent No.: US 10,374,906 B2
(45) Date of Patent: Aug. 6, 2019

(54) CLOUD SECURITY TOOL

(71) Applicant: Bank of America Corporation, Charlotte, NC (US)

(72) Inventors: Anant Bondalapati Sharma, Hyderabad (IN); Rohit Kumar Jain, Gurugram (IN); Sasidhar Purushothaman, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 205 days.

(21) Appl. No.: 15/672,535

(22) Filed: Aug. 9, 2017

(65) Prior Publication Data

US 2019/0052544 A1 Feb. 14, 2019

(51) Int. Cl.
*H04L 12/24* (2006.01)
*H04L 12/26* (2006.01)
*H04L 12/911* (2013.01)
*G06F 9/455* (2018.01)

(52) U.S. Cl.
CPC .......... *H04L 41/28* (2013.01); *G06F 9/45558* (2013.01); *H04L 41/046* (2013.01); *H04L 41/0893* (2013.01); *H04L 41/147* (2013.01); *H04L 43/16* (2013.01); *H04L 47/822* (2013.01)

(58) Field of Classification Search
CPC ... H04L 41/28; H04L 41/046; H04L 41/0893; H04L 41/147; H04L 43/16; H04L 47/822; G06F 9/45558

USPC ........................................ 709/220, 223, 224
See application file for complete search history.

(56) References Cited

U.S. PATENT DOCUMENTS

| | | | |
|---|---|---|---|
| 8,250,215 B2 | 8/2012 | Stienhans | |
| 8,745,397 B2 | 6/2014 | Letca | |
| 8,904,241 B2 | 12/2014 | Srivastava | |
| 8,924,559 B2 | 12/2014 | Brown | |
| 9,009,697 B2 | 4/2015 | Breiter | |
| 9,389,980 B2 * | 7/2016 | Ferris | G06F 9/542 |
| 9,444,716 B2 | 9/2016 | Astigarraga | |
| 9,450,853 B2 | 9/2016 | Astigarraga | |
| 9,461,934 B2 | 10/2016 | Cheemalapati | |
| 2019/0014023 A1 * | 1/2019 | Gupta | H04L 43/08 |

* cited by examiner

*Primary Examiner* — Chirag R Patel
*Assistant Examiner* — Marshall M McLeod
(74) *Attorney, Agent, or Firm* — Michael A. Springs

(57) ABSTRACT

An apparatus includes a scanner and a cloud engine. The scanner determines that a first cloud environment is of a first type and that a second cloud environment is of a second type that is different from the first type. The cloud engine selects a first tool and a second tool. The cloud engine also sets a first parameter and a first configuration for the first tool and a second parameter and a second configuration for the second tool. The cloud engine further receives a first alert that a security vulnerability in the first cloud environment has been detected and a second alert that resource consumption in the second cloud environment has exceeded a threshold. The cloud engine communicates a first solution to resolve the security vulnerability in the first cloud environment and a second solution to lower resource consumption in the second cloud environment.

21 Claims, 3 Drawing Sheets

CLOUD SECURITY TOOL

TECHNICAL FIELD

This disclosure relates generally to security in a cloud environment.

BACKGROUND

Cloud environments provide services to many users simultaneously regardless of the physical locations of the users. For example, cloud environments may provide users access to data and/or processing power. Many different cloud environments have been implemented to provide an array of different services to users.

SUMMARY OF THE DISCLOSURE

According to an embodiment, an apparatus includes a scanner and a cloud engine. The scanner determines that a first cloud environment is of a first type and that a second cloud environment is of a second type that is different from the first type. The cloud engine selects, based on the first type of the first cloud environment, a first tool and based on the second type of the second cloud environment, a second tool. The cloud engine also sets a first parameter and a first configuration for the first tool based on the first type of the first cloud environment and sets a second parameter and a second configuration for the second tool based on the second type of the second cloud environment. The cloud engine further receives, from the first tool, a first alert that a security vulnerability in the first cloud environment has been detected and receives, from the second tool, a second alert that resource consumption in the second cloud environment has exceeded a threshold. The cloud engine also, in response to the first alert, communicates a first solution to resolve the security vulnerability in the first cloud environment and in response to the second alert, communicates to the second tool a second solution to lower resource consumption in the second cloud environment.

According to another embodiment, a method includes determining that a first cloud environment is of a first type and determining that a second cloud environment is of a second type that is different from the first type. The method also includes selecting, based on the first type of the first cloud environment, a first tool and selecting, based on the second type of the second cloud environment, a second tool. The method further includes setting a first parameter and a first configuration for the first tool based on the first type of the first cloud environment and setting a second parameter and a second configuration for the second tool based on the second type of the second cloud environment. The method also includes receiving, from the first tool, a first alert that a security vulnerability in the first cloud environment has been detected and receiving, from the second tool, a second alert that resource consumption in the second cloud environment has exceeded a threshold. The method includes, in response to the first alert, communicating a first solution to resolve the security vulnerability in the first cloud environment and in response to the second alert, communicating to the second tool a second solution to lower resource consumption in the second cloud environment.

According to yet another embodiment, a system includes a first cloud environment, a second cloud environment, and a cloud security tool. The cloud security tool determines that the first cloud environment is of a first type and determines that the second cloud environment is of a second type that is different from the first type. The cloud security tool also selects, based on the first type of the first cloud environment, a first tool and selects, based on the second type of the second cloud environment, a second tool. The cloud security tool further sets a first parameter and a first configuration for the first tool based on the first type of the first cloud environment and sets a second parameter and a second configuration for the second tool based on the second type of the second cloud environment. The cloud security tool also receives, from the first tool, a first alert that a security vulnerability in the first, cloud environment has been detected and receives, from the second tool, a second alert that resource consumption in the second cloud environment has exceeded a threshold. The cloud security tool, in response to the first alert, communicates a first solution to resolve the security vulnerability in the first cloud environment and in response to the second alert, communicates to the second tool a second solution to lower resource consumption in the second cloud environment Certain embodiments provide one or more technical advantages. For example, an embodiment improves the security of a cloud environment by determining solutions for security breaches based on the type of the cloud environment. As another example, an embodiment improves the security of a cloud environment by selecting appropriate monitoring tools for the type of the cloud environment. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
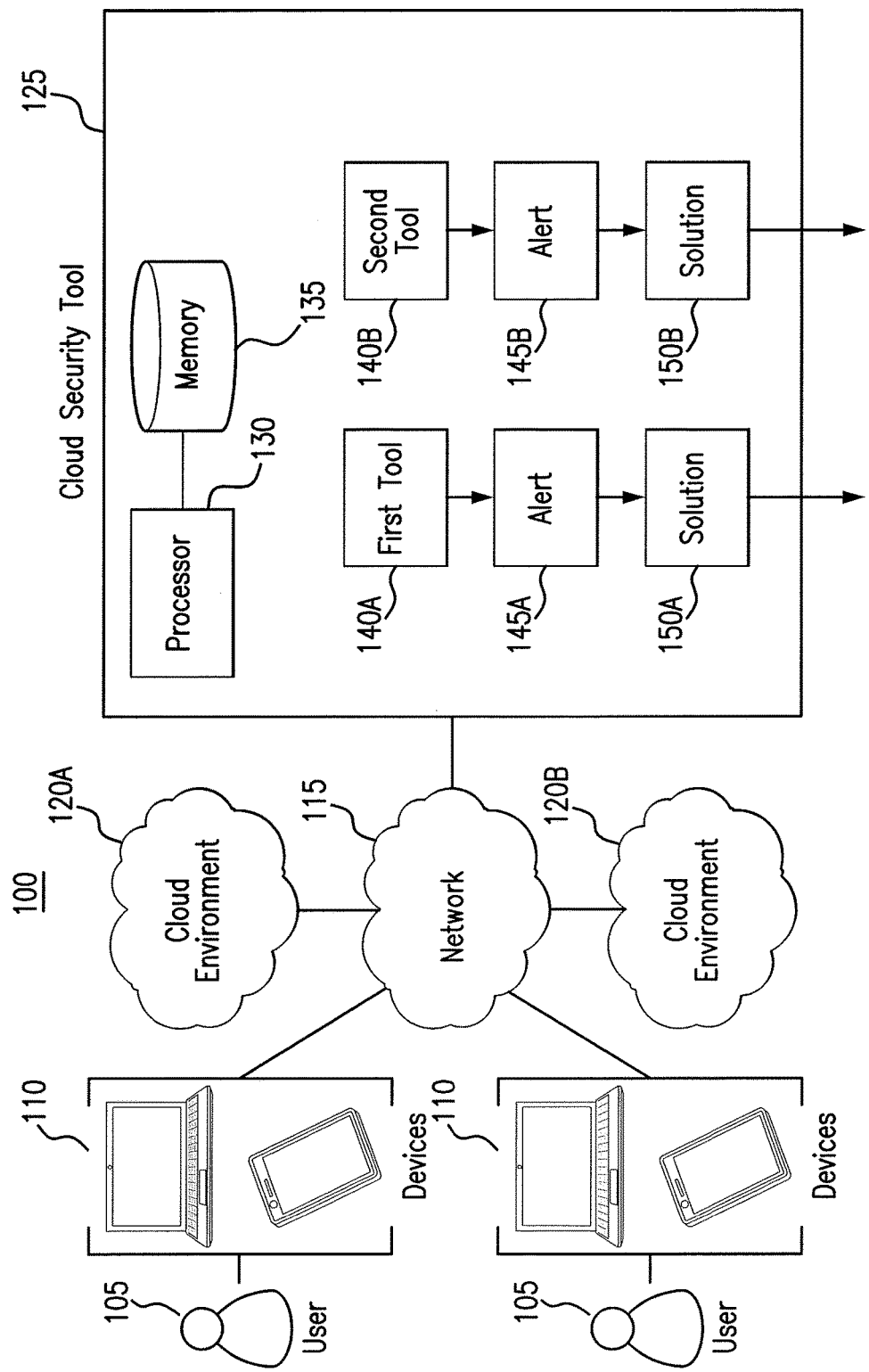
FIG. 1 illustrates a cloud security system.
Figure 2:
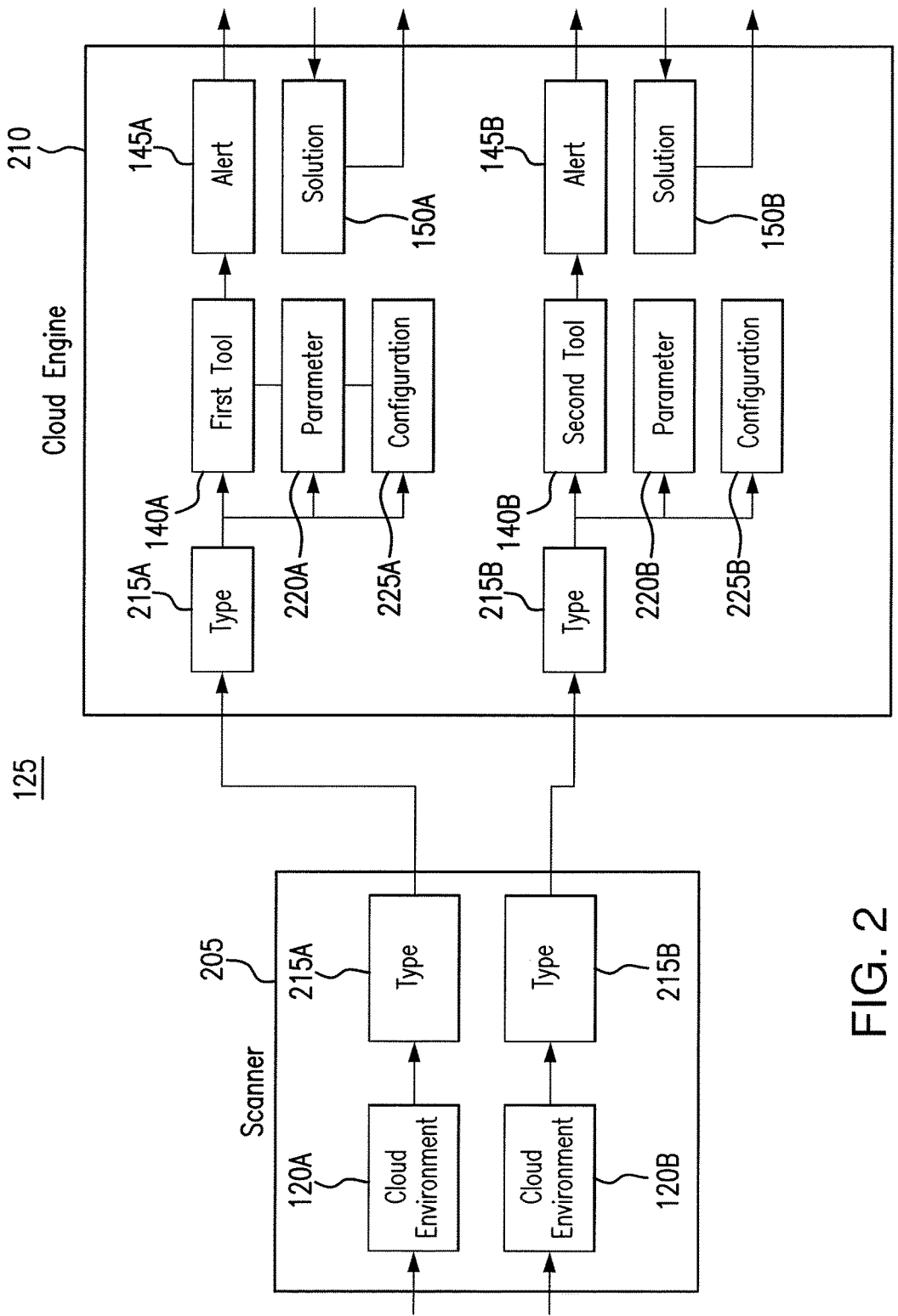
FIG. 2 illustrates a cloud security tool of the system of FIG. 1.
Figure 3:
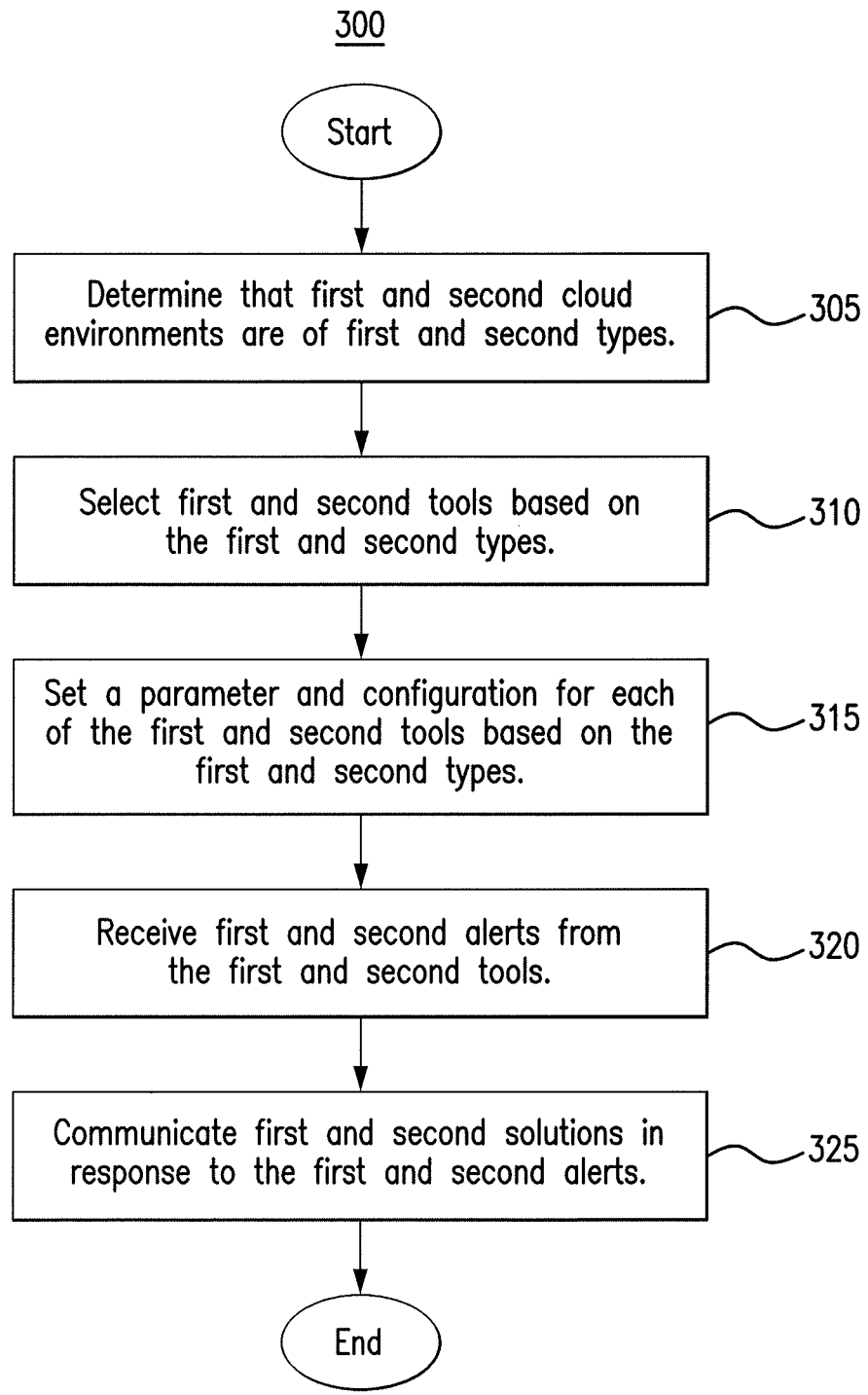
FIG. 3 is a flowchart illustrating a method for securing a cloud environment using the system of FIG. 1.

Embodiments of the present disclosure and its advantages are best understood by referring to FIGS. 1 through 3 of the drawings, like numerals being used for like and corresponding parts of the various drawings.

Cloud environments provide services to many users simultaneously regardless of the physical locations of the users. For example, existing cloud environments allow users to store data and to access that data through an internet connection. Users may then be able to access, review and edit their data without needing to have the files stored locally. As long as the user has an internet connection through which to access the cloud environment, the user may access the files or data stored in the cloud environment.

As another example, users may use cloud environments to execute shared applications. Each user may be provided an operational space in the cloud environment that can be used to execute applications for the user. As long as the user has an internet connection through which to connect to the operational space in the cloud environment, the user may be able to execute the applications in the cloud environment.

Many different cloud environments have been implemented to provide an array of different services to users.

Different types of cloud environments may provide services in different ways. Different types of cloud environments may also provide different means by which to administer and monitor themselves. As a result, their exists many different types of cloud environments that each have distinct ways of operation and administration. The different types of cloud environments may also experience different vulnerabilities. For example, cloud environments may be vulnerable to different security threats. As a result, different types of cloud environments may use different tools to monitor and/or remedy security threats, each with their own advantages and disadvantages.

An organization may use several different types of cloud environments to provide its users different services. As a result, the cloud environments may present different security vulnerabilities that may necessitate the use of different tools. As the complexity and number of cloud environments grow, the organization may be unable to appropriately monitor and/or resolve security vulnerabilities in its various cloud environments. As a result, the cloud environments may become vulnerable to attacks. These attacks may allow unauthorized users to gain access to the organization's sensitive and/or confidential information.

This disclosure contemplates a cloud security tool that monitors and/or resolves security vulnerabilities in different types of cloud environments. The cloud security tool determines an appropriate tool based on a determined type of a cloud environment. The tool may then be used to monitor a cloud environment for security vulnerabilities. When a security vulnerability is detected, the cloud security tool may determine an appropriate solution for the security vulnerability in the particular cloud environment. In this manner, the cloud security tool improves the security of cloud environments in certain embodiments. The cloud security tool will be described using FIGS. 1 through 3. FIG. 1 will describe the cloud security tool generally. FIGS. 2 and 3 will describe the cloud security tool in more detail.

FIG. 1 illustrates a cloud security system 100. As illustrated in FIG. 1, system 100 includes one or more users 105, one or more devices 110, a network 115, cloud environments 120A and 120B and cloud security tool 125. This disclosure contemplates system 100 including any number of users 105, devices 110, networks 115, and cloud environments 120. In certain embodiments, system 100 improves the security of cloud environments 120 by making determinations based on the types of cloud environments 120.

Devices 110 may also be used by users 105 to use and/or administer cloud security tool 125 or to access and use cloud environment 120. Devices 110 may be any appropriate device for communicating with components of system 100 over network 115. For example, devices 110 may be a telephone, a mobile phone, a computer, a laptop, a tablet and/or an automated assistant. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Cloud environment 120 may provide services to users 105 regardless of the physical location of user 105. For example, cloud environment 120 may allow user 105 to store data in cloud environment 120. User 105 may then access that data on cloud environment 120 by connecting to cloud environment 120 through network 115. As long as user 105 has an active connection to network 115 (e.g., an internet connection), user 105 may access data in cloud environment 120. Therefore, whether user 105 is at home, at work, or on vacation, user 105 may access the stored data. As another example, cloud environment 120 may execute applications for user 105. As long as user 105 has an active connection to network 115 such as, for example, an internet connection, user 105 may execute the application on cloud environment 120. The output of the application may be communicated to devices 110 of user 105 over network 115.

System 100 may include one or more cloud environments 120. In the illustrated example of FIG. 1, system 100 includes a first cloud environment 120A and a second cloud environment 120B. The first cloud environment 120A may be of a different type than the second cloud environment 120B. Because the first cloud environment 120A is of a different type, cloud environment 120A may operate differently than cloud environment 120B. As a result, cloud environment 120A may be susceptible to different security threats than cloud environment 120B and may need different monitoring and/or resolutions for different security threats. As the number of cloud environments 120 in system 100 increases, it may become more difficult to monitor each cloud environment 120 and resolve security threats on each cloud environment 120. Thus, as the number of cloud environments 120 increases, each cloud environment 120 may become more susceptible to security threats. As a result, the cloud environments 120 may cause user's 105 data and/or information to be stolen and/or compromised.

Cloud security tool 125 may be used to improve the security of cloud environments 120. As illustrated in FIG. 1, cloud security tool 125 includes a processor 130 and a memory 135. This disclosure contemplates processor 130 and memory 135 being configured to perform any of the operations of cloud security tool 125 disclosed herein.

Processor 130 is any electronic circuitry, including, but not limited to microprocessors, application specific integrated circuits (ASIC), application specific instruction set processor (ASIP), and/or state machines, that communicatively couples to memory 135 and controls the operation of cloud security tool 125. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of cloud security tool 125 by processing information received from network 115, device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein.

In operation, cloud security tool 125 scans system 100 to determine the various cloud environments 120. In the illustrated example of FIG. 1, cloud security tool 125 may determine that first cloud environment 120A and second cloud environment 120B are in system 100. Cloud security tool 125 may then determine a type for each cloud environment 120. Based on that determined type, cloud security tool 125 may then determine the appropriate monitoring and resolution scheme for each cloud environment 120.

In the example of FIG. 1, cloud security tool 125 may determine that based on the type for first cloud environment 120A, a first tool 140A should be used to monitor cloud environment 120A. Cloud security tool 125 may also determine that based on the type of second cloud environment 120B, a second tool 140B should be used to monitor cloud environment 120B. If first cloud environment 120A and second cloud environment 120B have different types, then first tool 140A and second tool 140B may be different. The differences in first tool 140A and second tool 140B may allow for different monitoring or monitoring of different aspects of each cloud environment 120. These tools 140A and 140B may detect different security vulnerabilities in each cloud environment 120. Each tool 140 may be executed locally on cloud security tool 125 or each tool may be executed on different devices such as, for example, devices in their respective cloud environments 120.

When a tool 140 determines that there is a security vulnerability in a cloud environment 120, the tool 140 may communicate and alert 145 to cloud security tool 125. In the illustrated example of FIG. 1, first tool 140A may communicate an alert 145A when first tool 140A detects a security vulnerability in cloud environment 120A. Second tool 140B may communicate alert 145B when second tool 140B detects a security vulnerability in cloud environment 120B. Each alert 145 may indicate the type of threat that has been detected.

For example, first tool 140A may determine that an unauthorized user has access to cloud environment 120A. As a result, alert 145A may identify the unauthorized user and indicate to cloud security tool 125 that that unauthorized user has accessed cloud environment 120A. As another example, second tool 140B may determine that resources in cloud environment 120B are being consumed at a pace that is greater than normal. For example, second tool 140B may determine that processor, network and/or memory resources in cloud environment 120B are being consumed at a rate greater than a threshold. The unexpected increase in resource consumption may indicate that a security vulnerability has been exposed and is effecting cloud environment 120B. Second tool 140B may communicate alert 145B to indicate that a particular resource is being consumed at a rate greater than a threshold. In certain embodiments, the threshold may be set based on the type of the cloud environment 120.

Cloud security tool 125 may receive alerts 145 and determine a solution 150 to address the problem indicated by alert 145. Using the previous example, cloud security tool 125 may determine that the unauthorized user in cloud environment 120A should be booted and that cloud environment 120A should be locked down until the vulnerability is fixed. Furthermore, cloud security tool 125 may determine that external connections to cloud environment 120B should be closed to resolve the resource consumption issue.

Solutions 150 may be stored locally on cloud security tool 125 or in an external database. Cloud security tool 125 may analyze alert 145 and communicate the identified problem to search for the proper solution 150 to the identified problem. Cloud security tool 125 may then communicate solution 150 to an appropriate user 105 that can implement the solution 150 in the cloud environment 120.

In certain embodiments, cloud security tool 125 may change the tool 140 used to monitor a cloud environment 120 after determining that a change has occurred in the cloud environment 120. For example, cloud security tool 125 may detect when a type of a cloud environment 120 has changed or when various hardware or software has been implemented in cloud environment 120. Based on these determined changes, cloud security tool 125 may select a new tool 140 to monitor the cloud environment 120.

In certain embodiments, by using cloud security tool 125 the security of cloud environment 120 may be improved because cloud security tool 125 selects an appropriate tool 140 to monitor the cloud environment 120. Furthermore, cloud security tool 125 provides an appropriate solution 150 for a detected problem in the cloud environment 120. The cloud security tool 125 will be discussed in more detail using FIGS. 2 and 3.

FIG. 2 illustrates the cloud security tool 125 of the system 100 of FIG. 1. As illustrated in FIG. 2, cloud security tool 125 includes a scanner 205 and a cloud engine 210. In particular embodiments, cloud security tool 125 improves the security of cloud environments by selecting an appropriate tool 140 to monitor a particular cloud environment and to determine a solution for security vulnerabilities in the cloud environment.

Scanner 205 may scan the system to determine the cloud environments 120 in the system. In the illustrated example, scanner 205 determines that cloud environment 120A and cloud environment 120B are in the system. Scanner 205 may also determine a type for each detected cloud environment 120. For example, scanner 205 may determine that cloud environment 120A is of a type 215A and that cloud environment 120B is of a type 215B. This disclosure contemplates that scanner 205 may determine the type 215 of a cloud environment 120 using any appropriate means. Scanner 205 may also determine that type 215A is different from type 215B.

Cloud engine 210 may receive the determined types 215 from scanner 205. Based on these determined types 215, cloud engine 210 may determine an appropriate tool 140 for monitoring a particular cloud environment 120. In the illustrated example of FIG. 2, cloud engine 210 determines that first tool 140A should be used to monitor cloud environment 120A based on type 215A. Cloud engine 210 also determines that second tool 140B should be used to monitor cloud environment 120B based on type 215B.

Cloud engine 210 may also set parameters 220 and configurations 225 based on the determined types 215. The parameters 220 in configurations 225 may be used by tools 140 to monitor cloud environment 120. For example, parameter 220 may include thresholds and/or metrics that tool 140 should monitor. In particular embodiments, parameter 220A or 220B may be a threshold that is set based on type 215A or 215B. As another example, configuration 225 may include network addresses and/or hardware addresses that tool 140 should monitor. In the illustrated example of FIG. 2, cloud engine 210 sets parameter 220A and configuration 225A for first tool 140A based on type 215A. Additionally, cloud environment 210 sets parameter 220B and configuration 225B for second tool 140B based on type 215B. Cloud engine 210 may use tools 140 to monitor cloud environments 120. When a tool 140 determines a security vulnerability in a cloud environment 120, tool 140 may communicate an alert 145 to cloud engine 210. In the illustrated example of FIG. 2, first tool 140A may communicate an alert 145A when it detects a security vulnerability in cloud environment 120A. Additionally, second tool 140B may communicate an alert 145B when it detects a that cloud environment 120B is consuming resources at a rate greater than a threshold. Cloud engine 210 may receive alerts 145 and determine appropriate solutions for these issues.

Cloud engine 210 may determine a solution 150 for a detected problem indicated by alert 145. In some embodiments, cloud engine 210 may retrieve solution 150 from an external database. In the illustrated example of FIG. 2, cloud engine 210 may determine solution 150A for the problem indicated by alert 145A. Cloud engine 210 may also determine solution 150B for the problem indicated by alert 145B. For example, if alert 145A indicates that an unauthorized user has accessed cloud environment 120A, cloud engine 210 may determine solution 150A that indicates that the unauthorized user should be booted from cloud environment 120A. As another example, if alert 145B indicates that processor, memory and/or network resource consumption has exceeded a threshold in cloud environment 120B, solution 150B may indicate that external connections to cloud environment 120B should be closed. Cloud engine 210 may then communicate solution 150 to an appropriate user who administers cloud environment 120 so that the solution 150 can be implemented. In some embodiments, cloud engine 210 may communicate solution 150 to a tool 140 to implement the solution 150. For example, cloud engine 210 may communicate solution 150A to first tool 140A and solution 150B to second tool 140B. The tool 140 may then implement the indicated solution 150.

In particular embodiments, cloud engine 210 may change parameter 220 and/or configuration 225 based on a detected change in a cloud environment 120. For example, cloud engine 210 may change parameter 220A or configuration 225A when it determines that a change occurred in cloud environment 120A. If a software or hardware change occurred in cloud environment 120A, then cloud engine 210 may determine that parameter 220A and/or configuration 225A should be changed to adjust the monitoring on cloud environment 120A. For example, if additional hardware was added to cloud environment 120A, cloud engine 210 may adjust parameter 220A to increase resource consumption thresholds for cloud environment 120A. The change may be one or more of a hardware and/or software change in cloud environment 120A or a change to the type of cloud environment 120A.

In some embodiments, cloud engine 210 may determine that a new tool 140 should be used to monitor cloud environment 120 based on a detected change in the cloud environment 120. For example, if cloud engine 210 determines that the type of cloud environment 120A has changed, cloud engine 210 may determine that the new type should be monitored by a new tool 140 instead of tool 140A. Cloud engine 210 may then select the new tool 140 to monitor cloud environment 120A.

In some embodiments, cloud engine 210 may generate a report that indicates the vulnerability or issue indicated by alert 145. For example, the report may indicate that alert 145A is indicating a security vulnerability in cloud environment 120A. As another example, the report may indicate that alert 145B is indicating that processor memory or network resource consumption has exceeded a threshold in cloud environment 120B. Cloud engine 210 may communicate the report to a user 105 to report on the issues experienced by the cloud environments 120.

In some embodiments, cloud engine 210 generates a blueprint for a cloud environment 120. The blueprint may indicate the hardware and software that forms the cloud environment 120 and the interconnections amongst the hardware and/or software. The blueprint may be communicated to a user so that the user can be made aware of the layout of a particular cloud environment 120.

In some embodiments, cloud engine 210 may determine an appropriate cloud environment 120 to send an operation. For example, cloud engine 210 may determine that an operation should be sent to a particular cloud environment 120 for execution based on the resource consumption rates in that cloud environment 120. As another example, cloud engine 210 may determine that an operation should be sent to a particular cloud environment 120 based on the lack of security vulnerabilities present in that cloud environment 120.

FIG. 3 is a flowchart illustrating a method 300 for securing a cloud environment using the system 100 of FIG. 1. In particular embodiments, cloud security tool 125 may perform method 300. By performing method 300, cloud security tool 125 improves the security of particular cloud environments based on the type of the cloud environment.

Cloud security tool 125 may begin by determining that first and second cloud environments are of first and second types in step 305. In step 310, cloud security tool 125 selects first and second tools based on the first and second types. Cloud security tool 125 then sets a parameter and configuration for each of the first and second tools based on the first and second types in step 315. In step 320, cloud security tool 125 receives first and second alerts from the first and second tools. Then, cloud security tool 125 communicates first and second solutions in response to the first and second alerts in step 325.

Modifications, additions, or omissions may be made to method 300 depicted in FIG. 3. Method 300 may include more, fewer, or other steps. For example, steps may be performed in parallel or in any suitable order. While discussed as cloud security tool 125 (or components thereof) performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
   a scanner configured to:
      determine that a first cloud environment is of a first type; and
      determine that a second cloud environment is of a second type that is different from the first type; and
   a memory and a hardware processor communicatively coupled to the memory, the hardware processor configured to implement a cloud engine configured to:
      select, based on the first type of the first cloud environment, a first tool;
      select, based on the second type of the second cloud environment, a second tool;
      set a first parameter and a first configuration for the first tool based on the first type of the first cloud environment;
      set a second parameter and a second configuration for the second tool based on the second type of the second cloud environment;
      receive, from the first tool, a first alert that a security vulnerability in the first cloud environment has been detected;
      receive, from the second tool, a second alert that resource consumption in the second cloud environment has exceeded a threshold;
      in response to the first alert, communicate a first solution to resolve the security vulnerability in the first cloud environment; and
      in response to the second alert, communicate to the second tool a second solution to lower resource consumption in the second cloud environment.

2. The apparatus of claim 1, wherein the cloud engine is further configured to:
   determine that a change occurred in the first cloud environment; and
   change at least one of the first parameter and the first configuration in response to the change.

3. The apparatus of claim 1, wherein the cloud engine is further configured to:
   determine that a change occurred in the first cloud environment;
   select, based on the change to the first cloud environment, a third tool; and
   set a third parameter and a third configuration for the third tool based on the change.

4. The apparatus of claim 1, wherein the cloud engine is further configured to set the threshold based on the second type of the second cloud environment.

5. The apparatus of claim 1, wherein the cloud engine is further configured to generate a report indicating that the security vulnerability has been detected and that resource consumption in the second cloud environment has exceeded the threshold.

6. The apparatus of claim 1, wherein the cloud engine is further configured to generate a blueprint indicating the first cloud environment and the second cloud environment.

7. The apparatus of claim 1, wherein the cloud engine is further configured to determine that an operation should be executed in the first cloud environment based on the second alert.

8. A method comprising:
   determining that a first cloud environment is of a first type;
   determining that a second cloud environment is of a second type that is different from the first type;
   selecting, based on the first type of the first cloud environment, a first tool;
   selecting, based on the second type of the second cloud environment, a second tool;
   setting a first parameter and a first configuration for the first tool based on the first type of the first cloud environment;
   setting a second parameter and a second configuration for the second tool based on the second type of the second cloud environment;
   receiving, from the first tool, a first alert that a security vulnerability in the first cloud environment has been detected;
   receiving, from the second tool, a second alert that resource consumption in the second cloud environment has exceeded a threshold;
   in response to the first alert, communicating a first solution to resolve the security vulnerability in the first cloud environment; and
   in response to the second alert, communicating to the second tool a second solution to lower resource consumption in the second cloud environment.

9. The method of claim 8, further comprising:
   determining that a change occurred in the first cloud environment; and
   changing at least one of the first parameter and the first configuration in response to the change.

10. The method of claim 8, further comprising:
    determining that a change occurred in the first cloud environment;
    selecting, based on the change to the first cloud environment, a third tool; and
    setting a third parameter and a third configuration for the third tool based on the change.

11. The method of claim 8, further comprising setting the threshold based on the second type of the second cloud environment.

12. The method of claim 8, further comprising generating a report indicating that the security vulnerability has been detected and that resource consumption in the second cloud environment has exceeded the threshold.

13. The method of claim 8, further comprising generating a blueprint indicating the first cloud environment and the second cloud environment.

14. The method of claim 8, further comprising determining that an operation should be executed in the first cloud environment based on the second alert.

15. A system comprising:
    a first cloud environment;
    a second cloud environment; and
    a cloud security tool comprising a memory and a hardware processor communicatively coupled to the memory, the hardware processor configured to:
       determine that the first cloud environment is of a first type;

determine that the second cloud environment is of a second type that is different from the first type;

select, based on the first type of the first cloud environment, a first tool;

select, based on the second type of the second cloud environment, a second tool;

set a first parameter and a first configuration for the first tool based on the first type of the first cloud environment;

set a second parameter and a second configuration for the second tool based on the second type of the second cloud environment;

receive, from the first tool, a first alert that a security vulnerability in the first cloud environment has been detected;

receive, from the second tool, a second alert that resource consumption in the second cloud environment has exceeded a threshold;

in response to the first alert, communicate a first solution to resolve the security vulnerability in the first cloud environment; and in response to the second alert, communicate to the second tool a second solution to lower resource consumption in the second cloud environment.

16. The system of claim 15, wherein the cloud security tool is further configured to:

determine that a change occurred in the first cloud environment; and change at least one of the first parameter and the first configuration in response to the change.

17. The system of claim 15, wherein the cloud security tool is further configured to:

determine that a change occurred in the first cloud environment;

select, based on the change to the first cloud environment, a third tool; and set a third parameter and a third configuration for the third tool based on the change.

18. The system of claim 15, wherein the cloud security tool is further configured to set the threshold based on the second type of the second cloud environment.

19. The system of claim 15, wherein the cloud security tool is further configured to generate a report indicating that the security vulnerability has been detected and that resource consumption in the second cloud environment has exceeded the threshold.

20. The system of claim 15, wherein the cloud security tool is further configured to generate a blueprint indicating the first cloud environment and the second cloud environment.

21. The system of claim 15, wherein the cloud security tool is further configured to determine that an operation should be executed in the first cloud environment based on the second alert.

* * * * *